United States Patent
Xu et al.

(10) Patent No.: US 12,394,033 B2
(45) Date of Patent: Aug. 19, 2025

(54) RECONFIGURABLE FABRIC INSPECTION SYSTEM

(71) Applicant: UNIVERSITY OF NORTH TEXAS, Dallas, TX (US)

(72) Inventors: Bugao Xu, Dallas, TX (US); Wenbin Ouyang, Dallas, TX (US); Jinliang Wei, Dallas, TX (US)

(73) Assignee: UNIVERSITY OF NORTH TEXAS, Dallas, TX (US)

( * ) Notice: Subject to any disclaimer, the term of this patent is extended or adjusted under 35 U.S.C. 154(b) by 535 days.

(21) Appl. No.: 17/290,171

(22) PCT Filed: Oct. 30, 2019

(86) PCT No.: PCT/US2019/058776
§ 371 (c)(1),
(2) Date: Apr. 29, 2021

(87) PCT Pub. No.: WO2020/092509
PCT Pub. Date: May 7, 2020

(65) Prior Publication Data
US 2022/0044389 A1 Feb. 10, 2022

Related U.S. Application Data

(60) Provisional application No. 62/752,377, filed on Oct. 30, 2018.

(51) Int. Cl.
*G06T 7/00* (2017.01)
(52) U.S. Cl.
CPC .. *G06T 7/0004* (2013.01); *G06T 2207/20081* (2013.01); *G06T 2207/20084* (2013.01); *G06T 2207/30124* (2013.01)

(58) Field of Classification Search
CPC ......... G06T 7/0004; G06T 2207/20081; G06T 2207/20084; G06T 2207/30124; G06N 3/045; G06N 3/084; G06N 20/00
See application file for complete search history.

(56) References Cited

U.S. PATENT DOCUMENTS

| | | | |
|---|---|---|---|
| 2001/0012381 A1 | 8/2001 | Sari-Sarraf et al. | |
| 2006/0206232 A1* | 9/2006 | Palmer | G01N 21/898 700/143 |

FOREIGN PATENT DOCUMENTS

| | | | |
|---|---|---|---|
| KR | 2000039959 A | * | 7/2000 |
| KR | 10895873 | | 9/2018 |
| WO | 2020092509 A1 | | 5/2020 |

OTHER PUBLICATIONS

"Mahmoud Afifi et al., Can we boost the power of the Viola-Jones Face Detector using Preprocessing? An Empirical Study, Jul. 2018, Journal of Electronic Imaging, vol. 27, Issue 4" (Year: 2018).*

(Continued)

*Primary Examiner* — Chineyere Wills-Burns
*Assistant Examiner* — Phuong Hau Cai
(74) *Attorney, Agent, or Firm* — Andrew M. Metrailer; Conley Rose, P.C.

(57) ABSTRACT

A method of identifying defects in a fabric can include obtaining an image of a fabric on a loom, extracting feature points within the image to generate an input image, processing the input image with a machine learning model, detecting one or more defects within the input image using the machine learning model, and providing, by the machine learning model, an indication of a defect in the input image.

21 Claims, 10 Drawing Sheets

(56) References Cited

OTHER PUBLICATIONS

"Radovan Stojanovic et al., Real-Time Vision-Based System for Textile Fabric Inspection, 2001, 2001 Academic Press, Real-Time Imaging 7, 507-518" (Year: 2001).*
"Zhoufeng Liu et al., Fabric Defect Detection Based on Faster R-CNN, Apr. 2018, Proceedings vol. 10615, Ninth International Conference on Graphic and Image Processing" (Year: 2018).*
"Arkady Cherkassky et al., Objective Evaluation of Textile Fabric Appearance Part 1: Basic Principles, Protrusion Detection, and Parameterization, 2010, Textile Research Journal, vol. 80[3]: 226-235" (Year: 2010).*
"Yonathan Dattner et al., Low Light CMOS Contact Imager with an Integrated Poly-Acrylic Emission Filter for Fluorescence Detection, May 2010, Sensors 2010, 10[5], 5014-2027" (Year: 2010).*
"Pengfei Li et al., The Real-Time Vision System for Fabric Defect Detection with Combined with Combined Approach, 2015, Part of the Lecture Notes in Computer Science book series vol. 9219, Image and Graphics pp. 460-473" (Year: 2015).*
"P.B.L. Meijer et al., An Experimental System for Auditory Image Representations, Feb. 1992, IEEE Transactions on Biomedical Engineering, vol. 39, Issue: 2" (Year: 1992).*
"Dorian Schneider et al., Vision-Based In-line Fabric Defect Detection using Yarn-Specific Shape Features, Feb. 2012, Proceedings vol. 8300, Image Processing: Machine Vision Applications, California" (Year: 2012).*
"Dorian Schneider et al., A Traverse Inspection System for High Precision Visual On-Loom Fabric Defect Detection, Mar. 2014, Machine Vision and Applications of Springer Link, vol. 25, pp. 1585-1599" (Year: 2014).*
International Search Report and Written Opinion dated Feb. 25, 2020, for International Application No. PCT/US2019/058776, filed on Oct. 30, 2019.
International Preliminary Report on Patentability dated May 14, 2021, for International Application No. PCT/US2019/058776, filed on Oct. 30, 2019.

* cited by examiner

RECONFIGURABLE FABRIC INSPECTION SYSTEM

CROSS-REFERENCE TO RELATED APPLICATIONS

This application is a filing under 35 U.S.C. 371 as the National Stage of International Application No. PCT/US2019/058776, filed on Oct. 30, 2018, entitled, "RECONFIGURABLE FABRIC INSPECTION SYSTEM," which claims the benefit of and claims priority to U.S. Provisional Application No. 62/752,377 filed on Oct. 30, 2018 and entitled "Reconfigurable Fabric Inspection System," both of which are incorporated herein by reference in their entirety for all purposes.

STATEMENT REGARDING GOVERNMENTALLY SPONSORED RESEARCH OR DEVELOPMENT

Not applicable.

BACKGROUND

In the production of fabrics, defects arising in the production process of a textile material can be detected in a number of ways including by human inspection. Even when optical defect detection is used, a human typically verifies the presence of a defect in the fabric. The use of human defect detection is time intensive and can require a large number of personnel to review the fabric and potential defects relative to the number of looms in operation. Further, the visual detection generally occurs in an inspection room after the fabric has been produced and removed from the loom. This can slow down the fabric production process while still resulting in incorrect identifications of defect. Even once a defect is properly identified, any product produced between the time of the inspection and the discovery of the defect may also be defective, thereby leading to unusable or reduced quality fabric. Most commercial fabric inspection systems are based on off-line, post-weaving detections, and do not prevent continuous defective production. Since defects can reduce fabric price by 45% to 65%, the existing defect detection processes may not be suitable in all fabric production processes.

SUMMARY

In some embodiments, a method of identifying defects in a fabric comprises obtaining an image of a fabric on a loom, extracting feature points within the image to generate an input image, processing the input image with a machine learning model, detecting one or more defects within the input image using the machine learning model, and providing, by the machine learning model, an indication of a defect in the input image.

In some embodiments, a method of identifying defects in a fabric comprises obtaining an image of a fabric on a loom, detecting one or more defects within the image using a first machine learning model, sending the image to a system controller in response to detecting the one or more defects within the image, verifying, by the system controller, a presence of the one or more defects within the image using a second machine learning model, and generating, by the system controller, an output signal in response to verifying the presence of the one or more defects within the image.

In some embodiments, a system for identifying defects in fabric comprises a contact image sensor (CIS) configured to be coupled to a loom and image a fabric on the loom, and a CIS controller in signal communication with the CIS. The CIS controller comprises a processor, and the CIS controller is configured to: receive an image of the fabric on the loom, process the image with a machine learning model, identify one or more defects in the fabric using the machine learning model, and provide an output indicative of the presence of the one or more defects in the fabric. In some embodiments, the system can also include a system controller. The system controller comprises a processor and is in signal communication with the CIS controller and a memory. The system controller is configured to: receive, from the CIS controller, the output indicative of the presence of the one or more defects, receive, from the CIS controller, the image of the fabric on the loom, process, in response to the output indicative of the one or more defects, the image of the fabric on the loom, verify a presence of the one or more defects in the fabric, and provide a second output indicative of the presence of the one or more defects in the fabric.

These and other features will be more clearly understood from the following detailed description taken in conjunction with the accompanying claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DESCRIPTION

Disclosed herein are systems and methods to address the issue in the modern weaving process of: real-time defect inspection for improving weaving efficiency and quality.

Warp, weft and point defects (e.g., harness misdraw, end-out, mispick, slubs) resulting from machine faults or yarn problems on the loom, can be preventable or correctable if detected on time.

Disclosed herein is an on-loom fabric inspection system and methods. The system can allow for real-time or near real time monitoring for defects in the fabric that can enable in-situ defect detection to pause the faulty production for correction. As used herein, near real time can refer to a processing time that takes latencies within the system into account (e.g. communication delays, processing times, etc.), and can be within about 10 seconds, within about 30 seconds, within about a minute, or within about 5 minutes of the time of the actual occurrence of an event. The present systems use contact image sensors (CIS) to acquire fabric images and machine learning algorithms to identify one or more different types of defects in different fabric types. Unlike a camera system, which normally has a limited resolution, stands in a far distance to the fabric and requires a separate lighting, a CIS integrates the image sensor chip, the lens, the lights source, and circuitry on the same substrate to be compact and lightweight, and it can have a short focal length (0-15 mm) to allow the CIS to be placed near the fabric as it is produced. Since CIS sensors are available for other uses, off the shelf CIS units with compact size and high resolution (typically 600-1200 dpi) are readily available. These features make CIS suitable for on-loom inspection where the space, resolution, and cost are important considerations for its success. The new system can be reliable, practical, and economical for individual loom deployments, which will significantly improve weaving efficiency and quality, and reduce the labor costs in both weaving operation and post inspection processes.

Figure 1:
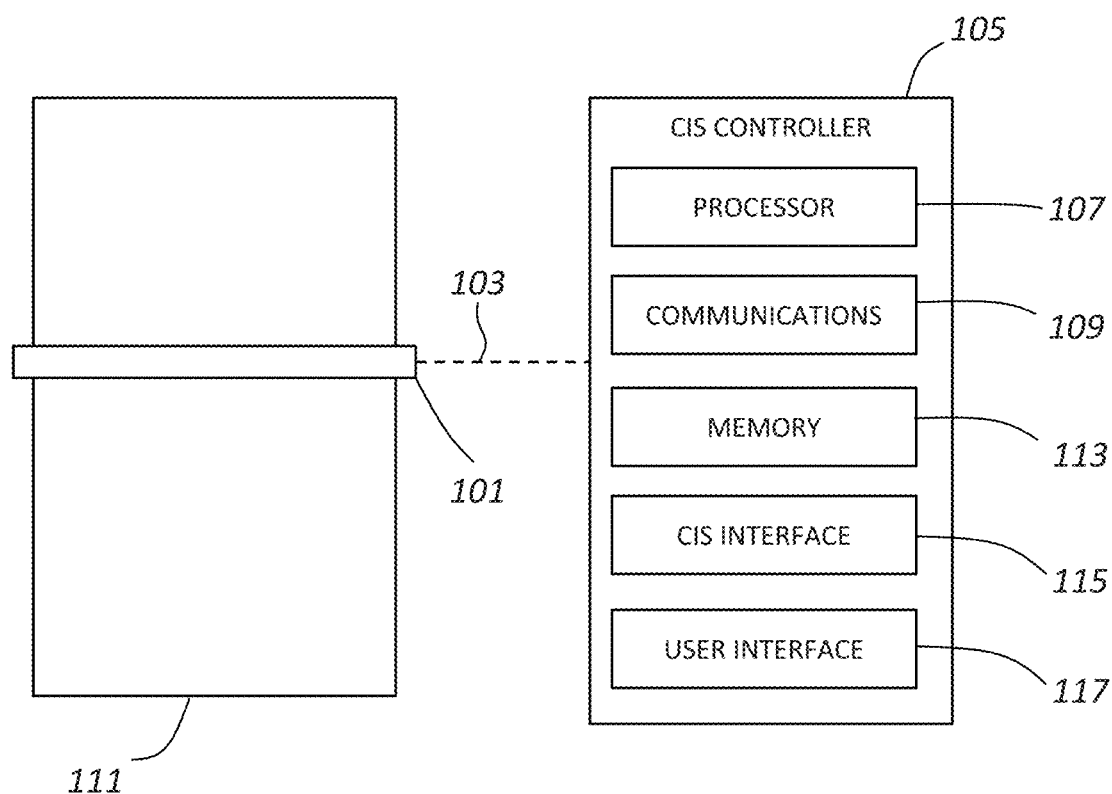
FIG. 1 illustrates a schematic representation of a defect detection system for a sheet of fabric according to some embodiments.

As shown in FIG. 1, a system for identifying defects in fabric can include a contact image sensor (CIS) 101 that can be used with a loom to image a surface of a sheet or fabric 111. A CIS controller 105 can be in signal communication with the CIS 101. The CIS controller 105 can comprise a processor 107, a communications system 109, a memory 113, and a CIS interface 115 used to control the CIS 101.

Figure 2:
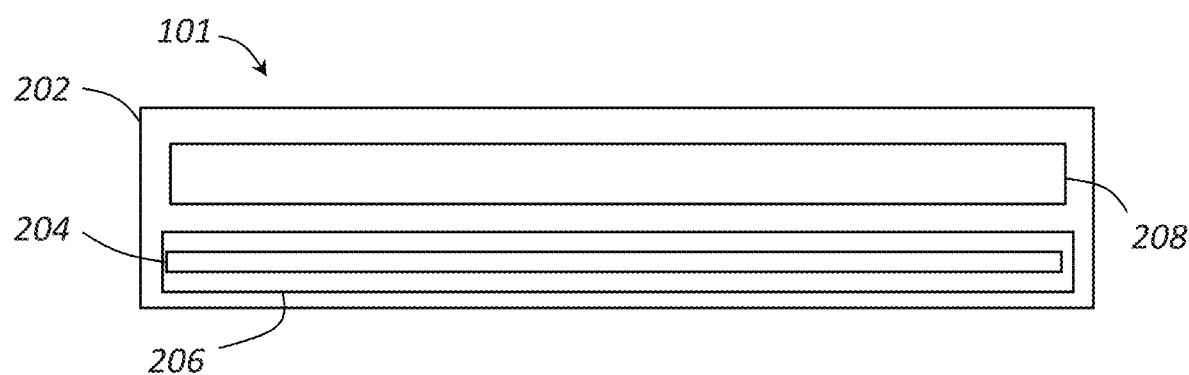
FIG. 2 illustrates a schematic representation of a contact image sensor (CIS) according to some embodiments.

As shown schematically in FIG. 2, the CIS 101 can comprise an imaging sensor 204, a light source 208, and a lens array 206 disposed over the imaging sensor 204. The components can be arranged on a substrate 202. The imaging sensor 204 can comprise a single component or array of sensors. The imaging sensor 204 serves to capture one or more images of the fabric at a framerate and resolution sufficient to capture any defects as the fabric passes the CIS 101, as described in more detail herein. The imaging sensors 204 can comprise any suitable sensor technology with a suitable resolution. In some embodiments, the imaging sensor 204 can comprise CCD based sensor, CMOS sensors, and the like.

The light source 208 can comprise one or more light sources disposed in an array along the substrate 202. The light source 208 serves to illuminate the surface of the fabric with a controlled brightness, and in some embodiments, coloration, to allow the imaging sensor 204 to image the surface of the fabric. In some embodiments, the light source 208 can comprise one or more light sources used with a light guide disposed on the substrate 202. The light source 208 can comprise any suitable source such as incandescent, halogen, and/or light emitting diode (LED) based light sources used directly on the board or with a light guide.

The lens array 206 is disposed between the fabric 111 and the imaging sensor 204 and serves to focus the light coming from the fabric onto the imaging sensor 204. In some embodiments, the CIS can have a short focal length of between 0 and 15 mm (where 0 mm refers to the surface of the CIS contacting the fabric 111). Thus, the lens array can be suitably designed to allow the image of the fabric to be focused on the imaging sensor 204 at a selected distance between the CIS 101 and the surface of the fabric.

The CIS 101 can provide images of the fabric 111 at a rate and resolution suitable to capture images of the fabric as it passes the CIS 101. In some embodiments, the imaging sensor 204 can capture images at a rate of between about 0.5 and 3 millisecond (ms)/scanned line (line), or between about 1 and 2 ms/line. The high scan rate can allow for multiple images to be captures between consecutive weft thread inserts, thereby allowing for multiple images to be used in the analysis steps.

The imaging sensor 204 can have a resolution of between about 200 and 1400 dpi, or between about 600 and 1200 dpi. A resolution of 600 dpi converts to approximately 0.042 mm/pixel, which represent the transverse resolution of the images. At a resolution in the range of 600-1200 dpi can provide a sufficient resolution to identify defects in the fabric. This can allow for the longitudinal resolution of the images (e.g., the resolution in a direction along the movement of the fabric on the loom) to be roughly the same as the transverse resolution (e.g., the resolution in a direction parallel to the width of the fabric).

Various types of fabric defects can be detected by the system including, but not limited to, warp streaks, reediness, weft bar, weft crack, thick and thin locations, weft loops, box marks, high incidence of warp breaks, weft breaks, shuttle traps, shuttle flying, smashes, bad selvedge, broken picks, bullet, half pick, broken ends, coarse ends, coarse pick, slough off, thick end and thick picks, double end, end out, fine end, jerk-in, knot, loom bar, loom barre, misdraw, mispick, reed mark, reed streak, set mark, shade bar, stop bar, tight end, stain, float, pin marks, contamination of fluff, harness misdraw, slubs, and combinations thereof. Different fabrics can experience different sets of defects, and thus not all fabrics may experience all types of the defects listed.

Figure 3:
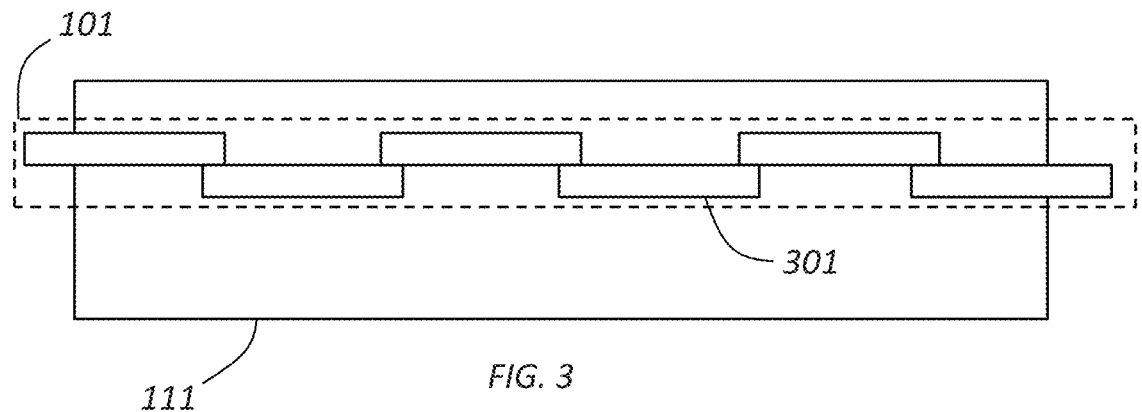
FIG. 3 illustrates a schematic representation of another contact image sensor (CIS) according to some embodiments.

The CIS 101 can be configured to have a length that allows it to image the entire surface of the fabric 111, depending on the width of the fabric 111 being produced. In some embodiments, the CIS can comprise an array of individual CIS devices. As shown schematically in FIG. 3, the CIS 101 can be formed from a series of individual CIS devices 301. In order to capture images at the edges of any particular CIS device 301, the CIS devices 301 can be arranged in an offset and overlapping arrangement. This can allow the entire width of the fabric 111 to be imaged, even if some portions of the fabric are imaged by multiple CIS devices 301. In some embodiments, between 2 and 16 of the CIS devices 301 can be arranged to cover a width of the fabric 111. The use of a plurality of CIS devices 301 also has the advantage of allowing the CIS 101 to be flexibly configured to match a width of a fabric produced by any individual loom by including a suitable number of CIS devices 301 sufficient to capture the full width of the fabric 111.

When a plurality of CIS devices are present, the CIS devices can be used serially. The use of the CIS devices to serially capture images can reduce the equipment needs of the system, but may have a longer data acquisition period. In the serial operating mode, each line of fabric that is scanned can require a scanning rate for each CIS device multiplied by the number of devices such that a second or subsequent device can only capture an image after the preceding CIS device has captured and communicated its own image. The CIS devices can have an acquisition speed sufficient to allow for serial operation while still capturing one or more images between each weft thread insertion.

Figure 4:
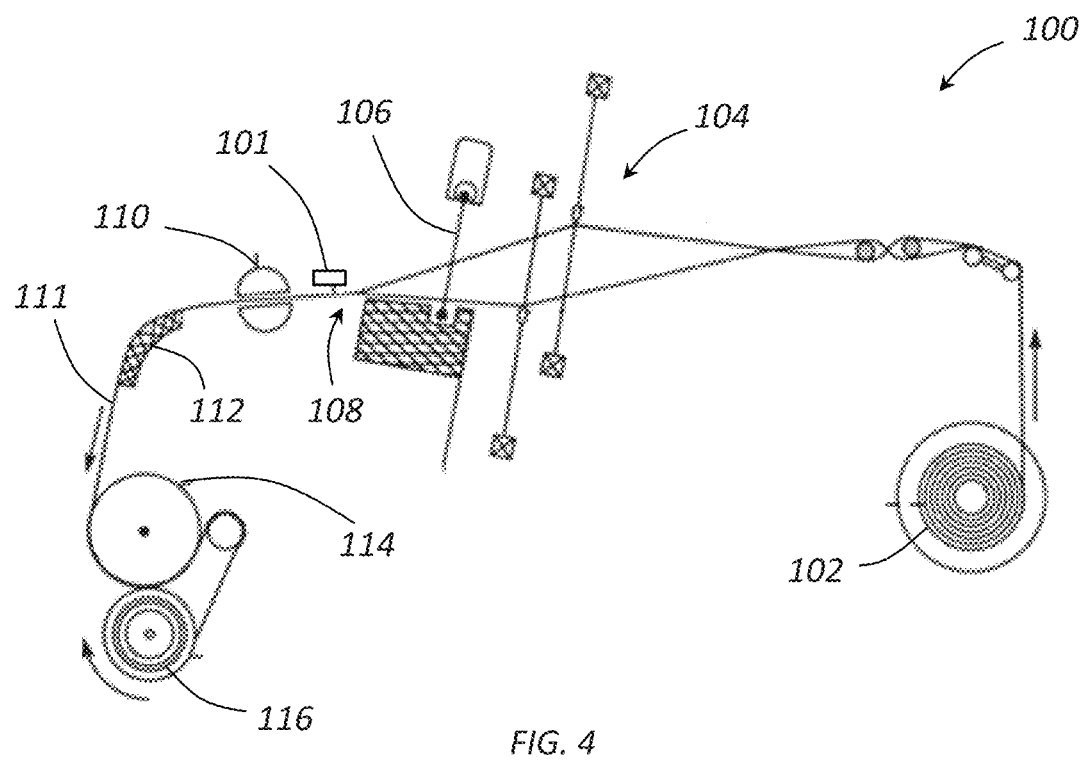
FIG. 4 illustrates a schematic representation of a loom having a CIS associated therewith according to some embodiments.

The CIS 101 can be arranged to image the fabric on a loom 100. FIG. 4 illustrates an exemplary schematic of a loom 100 having a CIS 101 arranged near its fell thereon. In general, a loom combines longitudinal or warp threads with weft threads in an interlaced pattern to form fabric in the form of a sheet or layer. The loom 100 can comprise a warp beam 102 used to hold the warp threads or yarns in place. The warp threads can pass through a series of rollers prior to passing to the heald 104. The heald 104 is used to separate the warp threads and hold the warp threads in place during the fabric formation. A shuttle, air jet, water-jet, or rapier can be used to insert weft threads into the warp threads to form the interlaced fabric. A reed 106 can be used to tighten the weft threads at the fell 108 to form the fabric 111. A temple 110 serves as a roller to hold the formed fabric 111 prior to the fabric 111 passing over the breast beam 112 to the emery roller 114 to properly tension the fabric 111. The final fabric 111 that is formed can be taken up on a cloth roller 116 where the fabric 111 can be retained until being later used. When the cloth roller 116 is full of the formed fabric 111, a new roller can be inserted and the process can continue to form a new roll of fabric 111. While described in terms of the loom shown in FIG. 1, various other looms can be used, and additional elements can be present within the loom. As described herein, the CIS 101 can be used on the loom 100 at any point at which the fabric 111 has been formed (e.g., after the heald 104) so that the fabric 111 can be imaged for use with the systems described herein. Typically, this can be at a location between the fell 108 and the cloth roller 116.

Returning to FIG. 1, the CIS 101 can be in signal communication with a CIS controller 105. The CIS controller 105 can receive images from the CIS 101 received over a communications link 103. The CIS controller 105 can comprise a processor 107, a communications system 109, a memory 113, a CIS interface 115 used to control the CIS 101, and a user interface 117 for providing outputs to a user, accepting inputs, and/or displaying information and images. In some embodiments, the processor 107 can comprise one or more individual processors. For example, the processor 107 can comprise a two core controller. The processor 107 can use a direct memory access (DMA) controller (e.g., in an ARM Cortex-M4 processor) to gather the digital image signals from the CIS with fewer CPU resources.

The communications system 109 can provide for communications with the CIS 101 and outside networks or systems (e.g., a systems controller as described in more detail herein). The communications can occur over wired or wireless communication channels. For example, the communication system 109 can comprise one or more communication devices such as modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), wireless fidelity (WiFi) communication cards, and/or other air interface protocol radio transceiver cards, and other well-known network devices. These devices may enable the processor 107 to communicate with one or more external devices such as a system controller via the Internet, one or more intranets, and/or a direct communication channel. Such communications may be received from and outputted to the network and/or other devices, for example, in the form of a computer data signal, which can be embodied in a carrier wave in some embodiments.

In some embodiments, the communications link 103 can comprise a wired connection between the CIS controller 105 and the CIS 101, though wireless communications can be used in other embodiments. When a wired connection is used, the communications link 103 can be used to transmit information from the CIS 101 to the CIS controller 105 (e.g., image signals), and control signals for the CIS 101 can be transmitted from the CIS controller 105 to the CIS 101. The communications link 103 can support a suitable data transmission rate to accept the images while still providing two way communications. Typical Ethernet speeds can be around 100 Mb/s, which should be sufficient to meets the data transmission criteria between the CIS 101 and the CIS controller 105. In some embodiments, the images sent from the CIS 101 to the CIS controller 105 can be sent using standard packet based communications protocols.

The CIS interface 115 can be used to control the CIS as part of the image acquisition. As part of the image acquisition process, the CIS interface 115 can synchronizes the CIS scanning or image acquisition with the fabric production in order to provide sharp and/or undistorted line images from the CIS 101. The CIS interface 115 can comprise a CIS control system that can comprise a CIS hardware driver responsible for the CIS assembly control. The CIS hardware driver can be stored in the memory and use various circuitry (e.g., analog to digital converters, multiplexer, filters, amplifiers, etc.) along with the processor to process the images received from the CIS 101. In some embodiments, the output of the image sensor 204 can be an analog signal. Circuitry within the CIS interface 115 can be used to receive and convert the analog output to a digital signal suitable for use with the image recognition models as described here.

Figure 5:
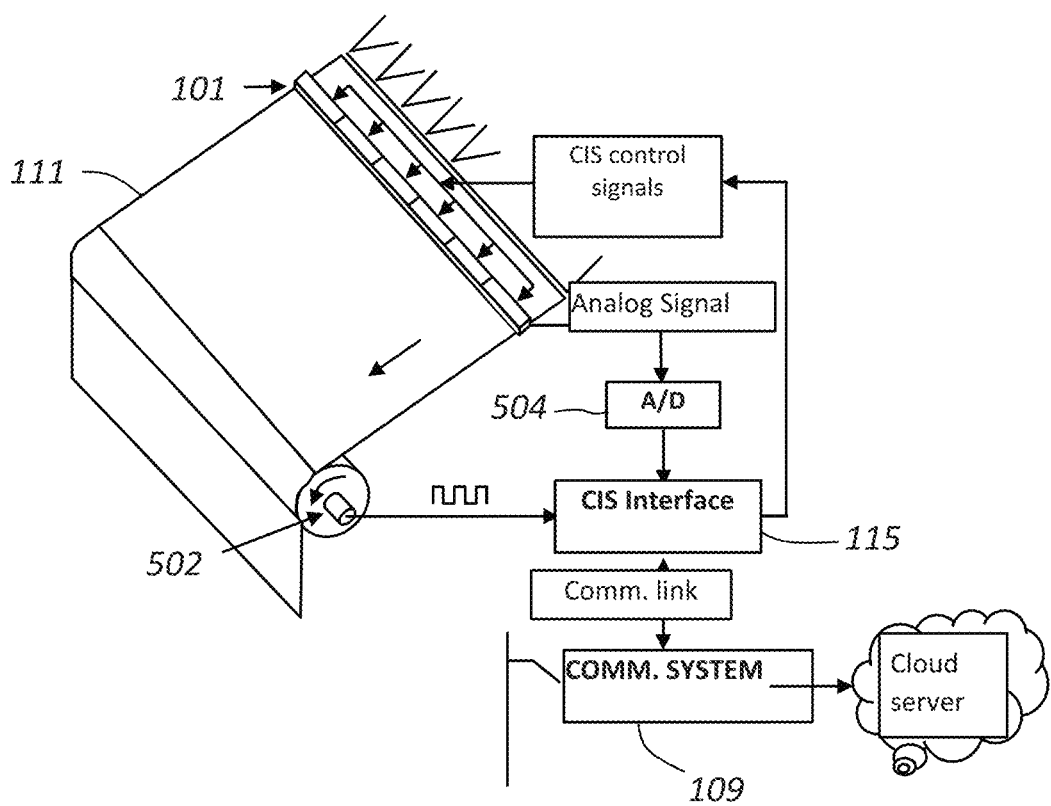
FIG. 5 illustrates a schematic representation of a loom having a CIS associated therewith according to another embodiment.

As shown in FIG. 5, the CIS interface 115 can be used to control the image acquisition process. As illustrated, the image signals from the CIS 101 can be sent through an analog to digital converter 504 when the image signals from the CIS 101 are analog. If the signals from the CIS 101 are digital (e.g., when the CIS 101 comprises an A/D converter), the converter 504 may not be needed. The image signals can then pass to the CIS interface 115.

The CIS interface 115 can control the CIS 101 including the rate of the image acquisition, the brightness of the light source, and any other parameters of the CIS 101 that may be modified during the acquisition process. For the control of the light source, the current provided to the light source can determine the brightness of the light source (e.g., an LED, etc.). The brightness can be controlled to allow an image to be captured of the surface of the fabric, and the brightness may need to be modified for different types of fabric, different colored fabric, to account for fade in the light source, and the like. In some embodiments, a formula that can be used to calculate a desired current provided to the light source in the CIS 101 can include:

$$I_F = \frac{V_s - V_F}{R}$$

where $I_F$ is the desired light source forward current, $V_S$ is the supply voltage, $V_F$ is the light source forward voltage, and R is the internal resistance. The CIS 101 can provide the supply voltage based on its own power supply. The CIS 101 can also provide a plurality of forward voltages to control the color or temperature of the light from the light source. For example, three forward voltages can be provided for RGB channels, respectively. According to the hardware interface and the current calculating formula, the forward DC voltage of the each channel can be determined independently by sending different signals to the CIS 101. Various circuitry can be used to perform this process. The calibration can be a part of the CIS interface 115 control applications, which can be implemented in software. This software based light source intensity adjustment can allow for color tones calibration if printed fabrics and/or colored fabrics are examined.

In order to control the image acquisition rate, a sensor can be used with one or more rollers on the loom. The sensors can comprise a position sensor or rotational speed indicator on the roller, to thereby provide an indication of fabric surface speed past the CIS 101. In some embodiments, a rotary encoder 502 can be installed on the shaft of a roller (e.g., the emery roller, etc.) to transform angular positions to quadrature pulses as the roller rotates. The pulse signal, whose frequency reflects the weaving cycles, can be transmitted to the CIS interface 115. The CIS interface 115 can calculate and update the CIS's 101 operating parameters, such as the light source brightness, scan rate, clock frequency, start pulse setup time, and pulse hold time using the position signals from the position sensor, which can control the CIS 101 setting with the adaptive parameters so as to maintain the consistency of line images. Consecutive line images can then be used to form an undistorted, two-dimensional fabric image when they are stacked in a rate proportional to the speed of the fabric movement. Since the CIS's 101 scan rate is much faster than the weaving speed, multiple scans can be acquired within one pulse period (i.e., the distance between two adjacent wefts). The scan rate and the pulse frequency are related to the longitudinal resolution (LR) of the image. When the LR is pre-selected (e.g., 600-1200 dpi), the scan rate can be determined by the pulse frequency. The pulsed time and duration of the light source arrays can then be calculated to be synchronized with the scan rate.

Once the images are captures and stacked to form the 2D images, the images can be stored in the memory 113 in the CIS controller 105 for further analysis, as described in more detail herein. In general, the images can be pre-processed and then analyzed using a machine learning model, which can be referred to as the CIS model herein, to identify and classify the various defects in the fabric. The CIS model can operate on the CIS controller 105, for example by being stored in the memory 113 and executing on the processor 107. When a defect is detected, various actions such as generating an alarm, stopping the loom, or alerting an operator can be triggered. In some embodiments, the identification of a defect in the fabric can trigger the images to be sent to a system controller, where the images can be processed using one or more additional models to more thoroughly check for a defect. The centralized system is described in more detail herein.

Initially, the signal processing and execution of the CIS model can be performed on the CIS controller 105. Due to the bandwidth limitation of the communication link, captured fabric images from all of the connected looms may not be able to be delivered to the central system controller simultaneously. The CIS controller 105 on each loom can then perform many image-processing functions to fulfill part of defect detection tasks, and compress the processed image (s) for communication to the server. On the central server side, the image can be further checked for the regions detected by the CIS 101 as defect candidates.

The defect detection process can use the CIS model. In some embodiments, the CIS model can comprise a machine learning approach that uses the image to identify the presence of a defect and/or classify the defect. The machine learning approach for the CIS model can rely on a training data set that can be obtained from actual defect images. The images can be classified by human classifiers to provide a labeled data set suitable for use in developing the CIS model. The labeled data set can then be used to train the CIS model using machine learning, including any supervised or unsupervised learning approach. For example, the CIS model can be a neural network, a Bayesian network, a decision tree, a logistical regression model, a normalized logistical regression model, or the like.

Once the CIS model is trained, the CIS model can be used to determine the presence or absence of defects in the fabric image(s). The output of the CIS model can provide an indication of the presence of defect in the fabric, and in some embodiments, the CIS model can provide a classification of the defect. When the type or classification of the defect is provided, the information can be used to aid in a subsequent review by an operator and/or in identifying any issues needing correction with the loom. The defect identification process can be repeated for each image created by the CIS 101 to provide a nearly continuous monitor of the fabric being produced from the loom.

In some embodiments, the CIS model can comprise a machine learning model. The CIS model can use statistical structural and neural-network learning approaches along with the high quality CIS images from the CIS 101. The CIS model can be dimensional independent and compatible with both motif and non-motif based fabrics. Motif fabrics can have patterns and/or textural differences throughout the fabrics while non-motif fabrics tend to be more uniform in appearance and texture. For each fabric, a primitive unit for can be defined from the images. The primitive unit serves as the base analysis unit for determining spacing, positioning, and the like as part of the defect detection algorithm within the CIS model.

Figure 6:
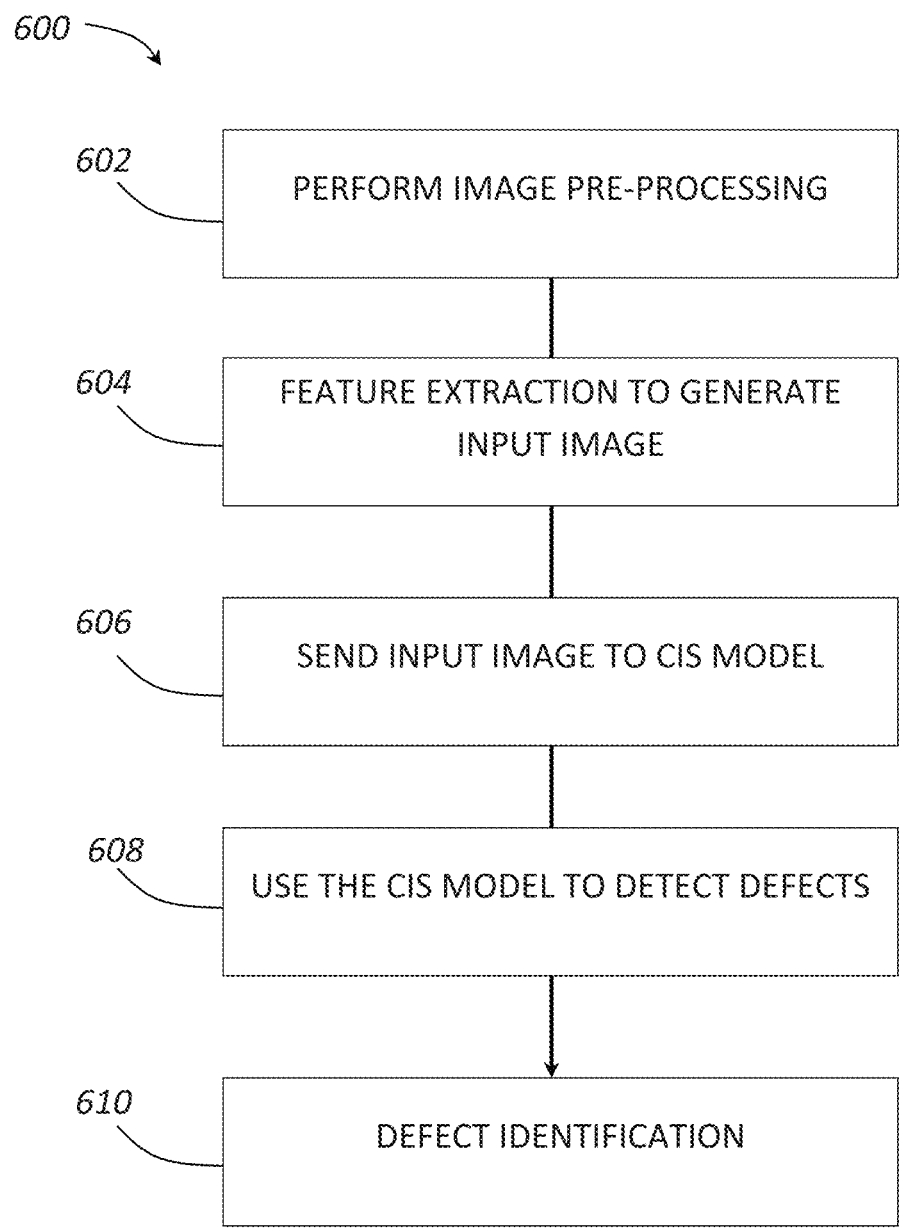
FIG. 6 illustrates a method of detecting defects in fabric according to some embodiments.

In some embodiments, the images can be processed on the CIS controller 105. A process for detecting defects using the images captures from the CIS 101 is illustrated in FIG. 6. The process 600 can be carried out for each image as it is constructed from the CIS 101 signals. As shown, the process 600 can begin with one or more image pre-processing steps 602. Various steps can be used to improve the image quality before the images are used in the CIS model. For example, various image de-blurring and/or image equalization processes can be carried out on each image. Once the image is pre-processed, feature extraction can be performed in step 604. The feature extraction generation can be performed to identify a standardized input image into the CIS model. The standardized input image can then be sent to the CIS model in step 606. Upon processing the probability model, the CIS model can provide a defect identification and/or classification in step 608. The resulting output of the CIS model is the output of the defect identification and/or classification provided in step 610.

The process 600 of detecting defects using the CIS model can begin with the image pre-processing. The vibration of a loom during weaving can cause blur effects in the images from CIS even if the time that a CIS head needs to capture one line is very fast (e.g., on the order of 1.5 ms). An image de-blurring step as part of the image pre-processing 602 can help to increase the sharpness and normalize input images. Various sharpening and/or normalization routines can be used to help to improve the images used in the model.

In some embodiments, a Wiener deconvolution can be used to pre-process the images. The Wiener deconvolution in the frequency domain can restore a degraded image to its original or near original quality. A Wiener filter can be expressed as follows, $$\hat{F}(u,v) = W(u,v)G(u,v)$$

where G(u, v) is the Wiener filter, W(u, v) is the frequency domain of original image I(i, j) after the discrete Fourier Transform (DFT). The de-blurred image can be obtained by apply the inverse DFT on $\hat{F}$(u, v). The Wiener filter is defined in terms of following spectra, $$G(u, v) = \frac{H^*(u, v)}{|H(u, v)|^2 + \frac{P_n(u, v)}{P_s(u, v)}}$$

where H(u,v) is the Fourier transform of the point-spread function (PSF), $P_s$ (u, v) is the power spectrum of the signal process, obtained by taking the Fourier transform of the signal autocorrelation, and $P_n$(u, v) is the power spectrum of the noise process, obtained by taking the Fourier transform of the noise autocorrelation.

In some embodiments, a further image equalization step can be applied in place of or in addition to the image sharpening step. The image equalization process can help to increase contrast and correct lighting and exposure differences between images. The resulting processed image(s) can then have more normalized features to be analyzed by the model. As an example, Clip Limited Adaptive Histogram equalization (CLAHE) can be applied to enhance contrast and correct illumination inhomogeneities from the raw image. The equalization is an important step to ensure the yarn extraction process working reliably.

In order to use various images across a variety of fabric types, a common set of features can be extracted from the images and used in the CIS model. The feature extraction process can be explained by considering different types of fabrics. When considering non-motif fabrics, defects detection algorithms can have inconsistent performance under different resolutions as a result of some regularization parameters or sophisticated thresholds being held constant in the algorithms. In fabric inspection, a size pre-defined sliding window can be used to calculate the local area texture features. If different resolution fabric images are evaluated with the same size of the sliding window, the defects segmentation results can be widely divergent. Motif-based fabric inspection algorithms or model show an ability to perform stably for fabrics with different patterns, but the same model can have a poor performance when a non-motif fabric (e.g., a plain weave, twill weave, etc.) containing defects is tested. For a plain or twill weaved type fabric, the primitive unit being analyzed can be defined as the single yarn, which informs less fabric structural information. With a lower resolution image, a single yarn can occupy 1-3 pixels as an example, and the sliding window with a yarn width size would not contain as much information as a pattern primitive unit can provide. With a higher resolution image, a single yarn can occupy 6-10 pixels as an example, and the yarns width variance in a fabric may be amplified. As a result, a single yarn based sliding window may not able to represent all other yarns, and more false defect detection alarms can be generated.

According to the human vision judgment, fabric defects tend to be based on a fabric local structure. Most fabrics can be classified into different groups that are composed of lattices of different shapes such as parallelograms, rectangular, rhombic, square, hexagonal, or similar shapes. Most regular weave fabrics have a clear repetitive unit, but some fabrics (e.g., a p1 group fabric in which a texture with a single lattice repeats itself over the image such as plain or twill fabrics) can have a primitive unit that can be manually defined on a yarn size level. For example, a yarn level between 2-10 warp or weft threads can be selected. For example, a yarn level unit can be defined as 5 warp yarns×5 weft yarns, though any sized unit can be used with the CIS model. Usually, fabric defects can be detected within such area by human visual judgment, and within such an area more fabric structural information can be extracted. At the pixel level, p1 group fabric images with different resolution will have different pixel size primitive units. For a p1 structural fabric, once a single yarn can be extracted, the primitive unit with 5 warp yarns×5 weft yarns of a plain/twill weaved fabric can be formed for use with the CIS model. The resulting primitive units can then be used to form the lattice information used with the CIS model.

Figure 7:
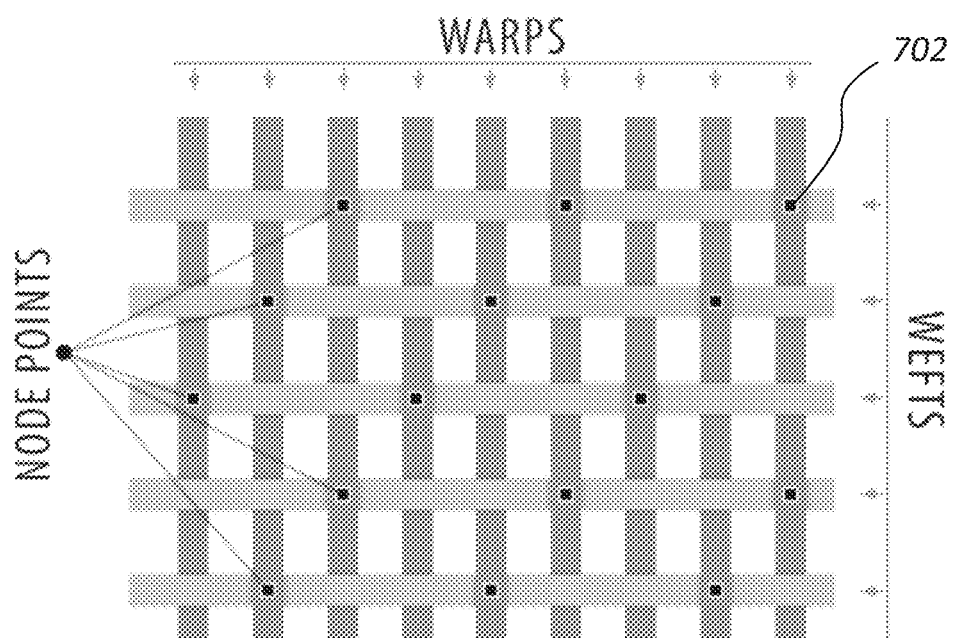
FIG. 7 illustrates features that can be extracted in an image of fabric according to some embodiments.

In order to retrieve the lattice information of the fabric image, a template matching algorithm can be applied to each image to detect characteristic feature points within the primitive unit. As depicted in FIG. 7, woven fabrics can be produced by interweaving horizontally passing yarns (wefts) and vertically passing yarns (warps) according to a pre-defined weaving pattern (binding). Node points 702 can be defined as corresponding to one or more specific features. As an example, the weft-warp intersections within the image where warps lie above wefts can be defined as node points (NP) within the image such that these locations form the feature points of interest in the image. Other features could be used as well so long as the features are consistent and able to be identified. The template matching algorithm used in the feature point extraction can be set up using a calibration based on manually selected node points in a defect free image. Once calibrated in this way, various similarity based correlation measures can be used to identify the node points in the images from the CIS. In some embodiments, the similarly based correlation measurements can include sum of absolute differences (SAD), sum of hamming distances (SHD), sum of squared differences (SSD), normalized cross correlation (NCC), and/or zero-mean-normalized-cross-correlation (ZNCC). In some embodiments, the similarly based correlation measurement can be a ZNCC measure used with the images from the CIS, including the optionally pre-processed images as described herein.

The ZNCC measure can be calculated using a fast Fourier transform (FFT) in combination with summed area tables. The derivation can be expanded for use with a graphics processing unit (GPU) implementation. The result of the ZNCC measure is the detection of the node points to create a mapping of the node points within the image. This information can then be used in the CIS model to identify defects in the image of the fabric.

Once the mapping of the node points is complete, the mapping can be used with the CIS model, which can include a machine learning model, to identify defects in the image of the fabric. In some embodiments, the CIS model comprises a neural network. In order to use fully connected layers in the neural network structure, deep convolutional neural networks (CNNs) require fixed image size for both training and testing image datasets, which limits both the aspect ratio and the scale of the input image. Currently brute force methods, either by cropping or warping an image to meet the neural network input size requirement, can manually distort the image or result in loss of image information. In the present models, the primitive unit or input image is not based on pixels, but an area defined by a plurality of warp threads and weft threads (e.g., a 5 warp yarns×5 weft yarns) on different patterns of fabric, which allows for the digital image dimensions to be consistent across different image and types of fabric. In order to make the neural network suitable for different fabric patterns, a spatial pyramid matching (SPM) can be introduced to solve the fixed-size constraint on the connection layers. SPM is able to generate a fixed length output regardless of the input size, while the sliding window pooling used in the other deep networks cannot. SPM also uses multi-level spatial bins, while the sliding window pooling uses only a single window size. Multi-level pooling has been shown to be robust to object deformations. For example, SPM can pool features extracted at variable scales as a result of the flexibility of input scales. All of these factors can improve the recognition accuracy of deep networks.

Figure 8:
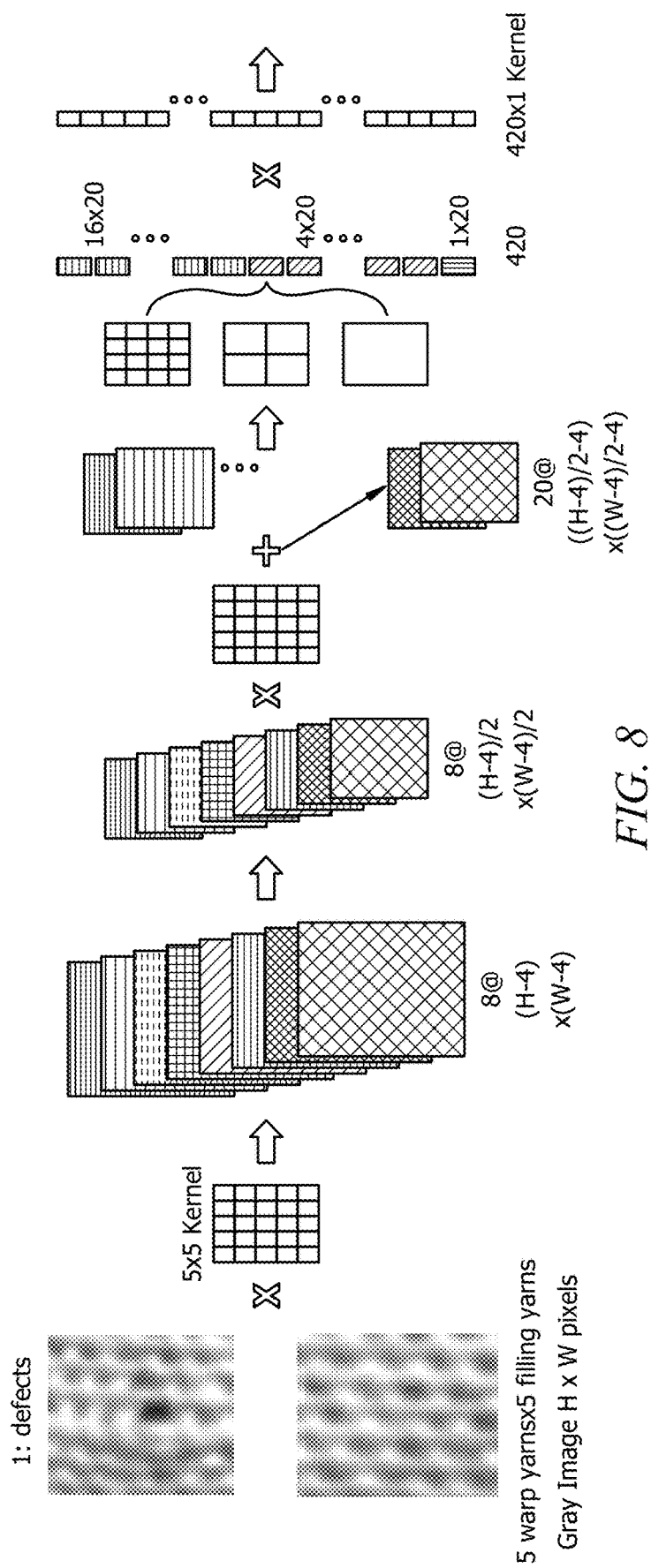
FIG. 8 illustrates a schematic representation of a neural network architecture according to some embodiments.

The CIS model can have a structure that is similar to a CNN. In some embodiments, the CIS model can comprise a SPM-CNN following a similar structure of a CNN with a plurality of layers, but replacing the last pooling layer with a SPM layer. As shown in FIG. 8, an exemplary 6-layer SPM-CNN includes: 1) an input layer is the gray image, 2) a first hidden layer is the convolutional layer that can have 8 kernels with the size of 5×5, 3) a second hidden layer that can be the pooling layer with 2×2 window, 4) a third hidden layer can be another convolutional layer that can have 20 kernels with the same size as the first convolutional layer kernels, 5) an SPM layer can be introduced after the second convolutional layer to obtain a fixed-length representation, and 6) an output layer with a binary result is obtained by convoluting a 420×1 kernel, where 1 indicates defects exists in the image area, and 0 represents a defects free area.

In an exemplary neural network implementation, the CIS model can comprise a plurality of layers. Except for the input layer, the input map of each layer neuron $X_k^L$, can be calculated by cumulating each feature map, $y_i^{L-1}$, of the previous layer convolved with its corresponding kernel, $w_{ik}^{L-1}$, as follows, $$X_k^L = f(x_k^L), x_k^L = b_k^L + \sum_{i=1}^{N_{l-1}} conv2D(w_{ik}^{L-1}, y_i^{L-1})$$

The first back propagation was performed on the output layer. A mean square error was calculated between the output layer and its corresponding ground truth image, as follows, $$E(I) = \frac{1}{2}\sum_p (y_o^L(I_p) - \text{Ground\_T}(I_p))^2$$

where $y_o^L$ indicated the output layer and Ground_T referred to the ground truth image, $I_p$ was the pixel p of the image I. The delta sensitivity of the error can be used to update kernels, and can be calculated as follows, $$\Delta_k^L(I) = \frac{\partial E}{\partial x_k^L} = \frac{\partial E}{\partial y_o^L}\frac{\partial y_o^L}{x_k^L} = (y_o^L(I) - \text{Ground\_T}(I))f'(x_k^L(I))$$

For the inter-back propagation among the hidden layers, a mean square error was used for delta sensitivity of the error calculating. The difference between back propagation on the output layer and inter-back propagation was to calculate the $\Delta y_k^L(I)$. Inversed convolution with zero-padding was applied as follows, $$\Delta y_k^l = \sum_{i=1}^{N_{l-1}} conv2D(\Delta_i^{l+1}, rot180(w_{ki}^l), \text{`ZeroPad'})$$

This can simply rotate the kernel matrix by 180 degrees, and convolute it with the delta sensitivity of the error from the next layer. The kernals can be updated for the i$^{th}$ layer by taking each kernel error as the cross product of the output of previous layer and the sensitivity, $\Delta_k^L(I)$, of the weight connecting the kth neuron in the current i$^{th}$ layer as $$\frac{\partial E}{\partial w_k^L} = x_k^{L-1} \times (\Delta_k^L(I))^T$$

Then weight values of the kernel can be updated as follows, $$w_k^L -= \varepsilon\frac{\partial E}{\partial w_k^L}$$

where is $\varepsilon$ the learning rate. In some embodiments, $\varepsilon$ can have a value of approximately $\varepsilon=10^{-4}$.

As described herein, the CIS model can be trained using actual images of fabric containing both defect free images and images with one or more types of defects. The training data can comprise a labeled data set used in the training of the model. In some embodiments, the CIS model can comprise a plurality of individual models, where each individual model can be used with a specific fabric type and/or defect type. The ability to use different models as part of the larger CIS model may improve the defect identification accuracy based on the individual variances between the different types of fabric. When a plurality of individual models are used, a separate labeled data set can be used to train each model, wherein the labeled data set corresponds to the fabric type and/or defect type being analyzed by the individual model.

The result of the CIS model can be a binary output of defect/no defect in the image of the fabric. In some embodiments, the CIS model can classify the defect type in addition to providing an indication of the presence of the defect. For example, one or more models can be used where each model can be used to identify a specific defect type. The output of the model can then be used to identify specific defect types and/or groups.

This process can be repeated for each image obtained by the CIS 101 as the fabric is produced. When a defect is detected, the CIS controller 105 can create a signal to alert an operator, sound an alarm, turn off or slow down the loom, and/or provide an output of presence of the defect. In some embodiments, the CIS model can classify the defect type in addition to providing an indication of the presence of the defect. If the defect is identified, the output from the CIS controller 105 can include an indication of the defect type and/or instructions or recommendations on how to address any issues with the loom that could create the identified type of defect.

As shown in FIG. 1, the system can comprise the CIS 101 and the CIS controller 105 as a self-contained system that can be deployed for use with a loom. In this system, the CIS can obtain the images and be controlled by the CIS controller 105. The CIS controller 105 can process the images and use the CIS model to detect defects in the images from the CIS 101. Further, the output from the CIS controller 105 can be used to provide an alarm or output indicative of the detection of the defects. The user interface 117 can allow the on-loom system to be controlled at the loom itself, thereby allowing for a compact system that is easy to implement in a variety of settings.

Figure 9:
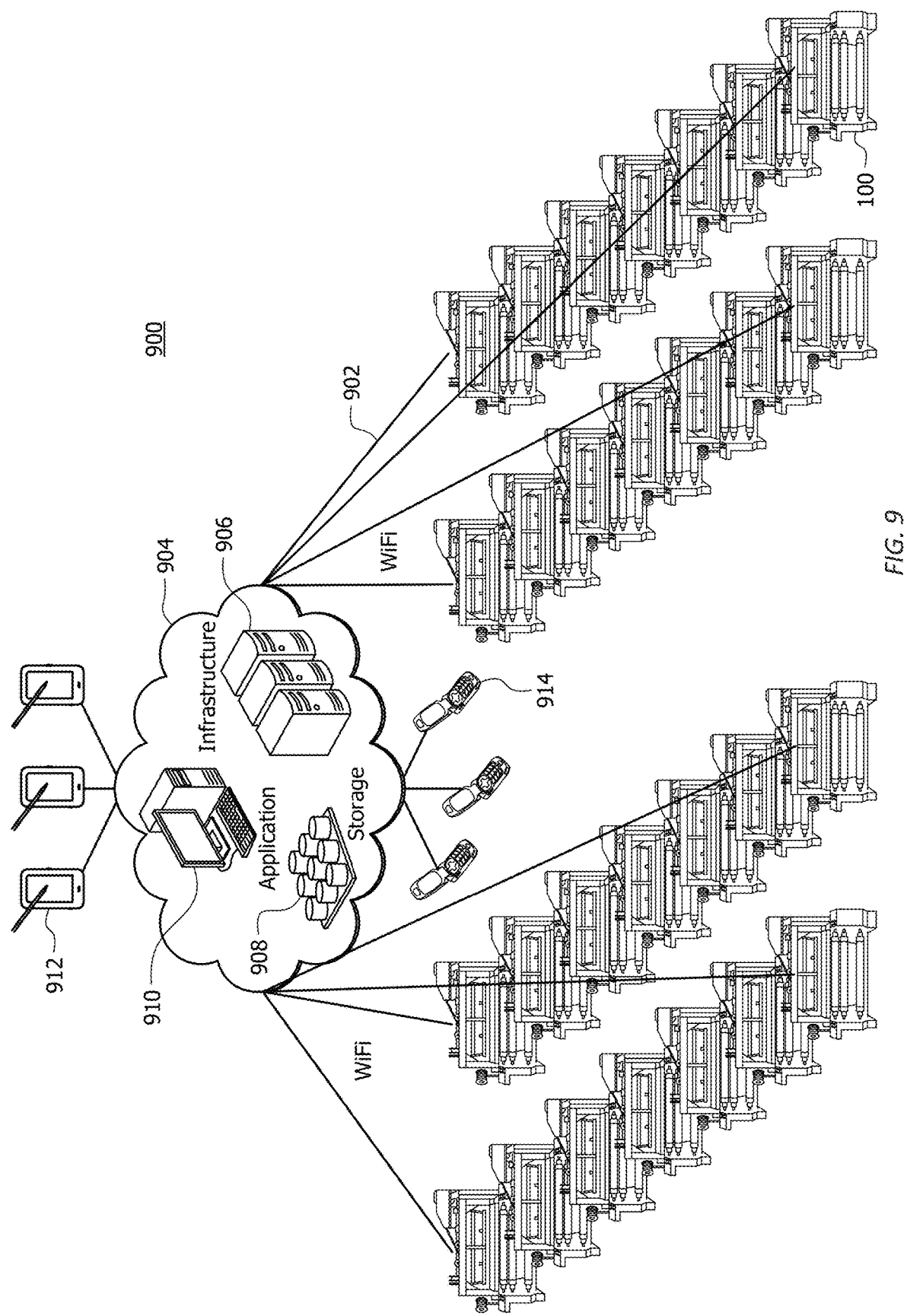
FIG. 9 illustrates a schematic representation of a system for detecting defects in fabric according to some embodiments.

The systems as described herein can also be used with a plurality of individual CIS based systems being connected through a centralized system controller. FIG. 9 illustrates a system for detecting defects 900 that comprises a plurality of looms 100, each of which can comprise a CIS and CIS controller as described with respect to FIGS. 1-8. Within this system, each CIS controller on each loom 100 can be in signal communication with a system controller 904 over a communications link 902. The system controller 904 can comprise a system processor 906, a memory 908, and a user interface 910. The system controller 904 can also be in signal communication with one or more mobile devices 914 and/or control interfaces 912. The mobile devices 914 and/or the control interfaces 912 can be connected to the system controller 904 via wired or wireless communication links 902, which can include remote wired or wireless connections through a network (e.g., a local area network, over the internet, etc.).

Figure 10:
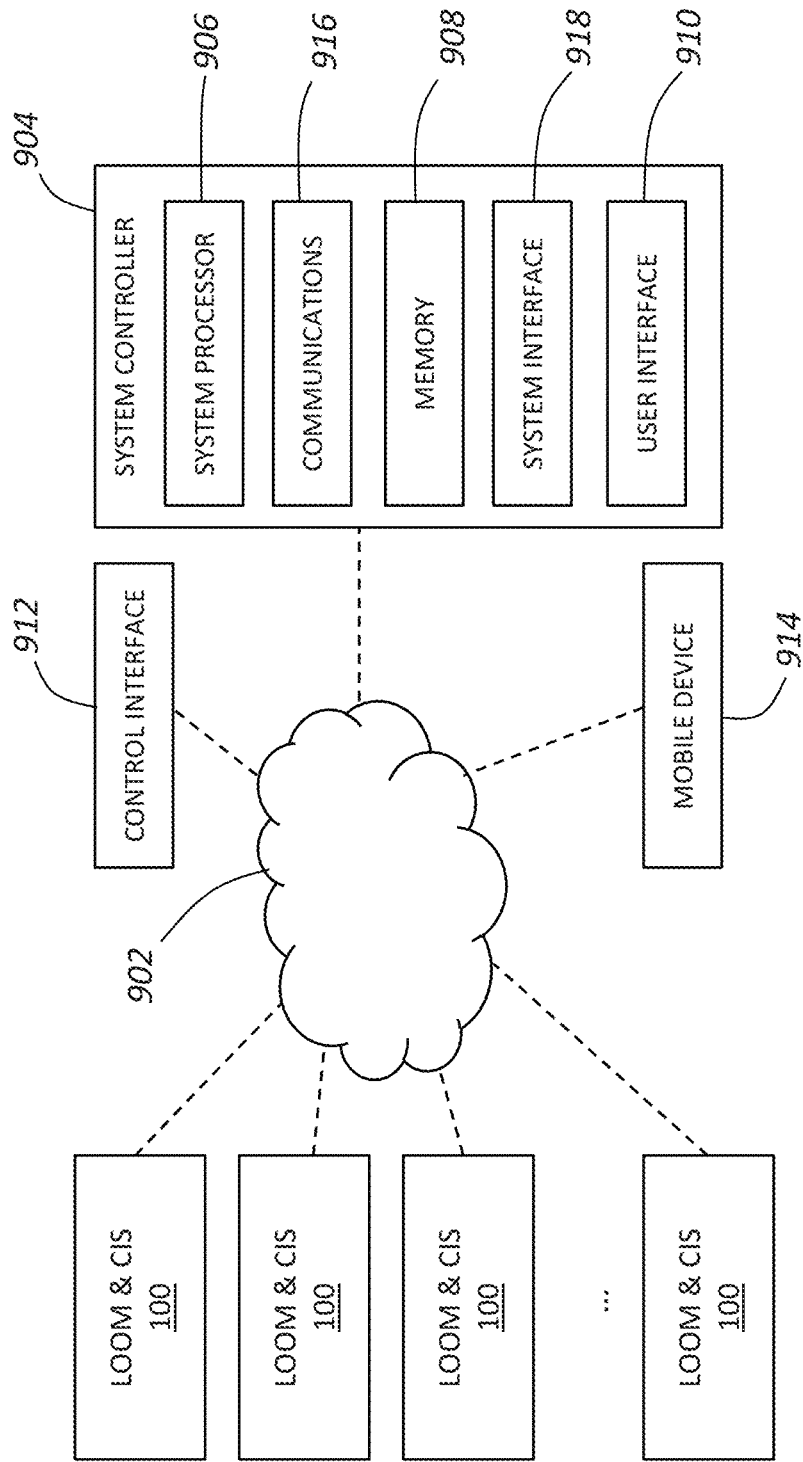
FIG. 10 illustrates another schematic representation of a system for detecting defects in fabric according to some embodiments.

FIG. 10 provides additional detail for the system controller 904. In some embodiments, the system controller 904 can also comprise a communications interface 916 and/or a system interface 918. The communication interface 916 can comprise various communication equipment and interfaces to allow the system controller 904 to send and receive signals from the CIS systems on each loom 100 as well as sending and receiving signals to the mobile devices 914, control interfaces 912, and other remote access devices. The user interface 910 can provide input and outputs at the system controller 904. The systems interface 918 can comprise code and/or an application that allows the system controller 904 to receive signals from the CIS system(s) at each loom 100, process the signals, and provide an additional layer of defect detection in the images at each loom 100.

The use of the system controller 904 can allow for a defect detection system that can control multiple on-loom CIS systems as described herein. The system controller can allow the data and images from each CIS system to be gathered and stored at a central location, and the system controller 904 can also enable access devices (e.g., the mobile devices 914, control interfaces 912, etc.) to access and monitor the working status of each loom 100.

The control application can be stored in the memory 908 and executed on the system processor 906 to enable a system based detection system. In this system, a two-stage defect detection strategy can be used. The first stage fabric defect detection can be executed on the CIS system at each individual loom 100, as described in more detail with respect to FIGS. 1-8. If a defect candidate region is found in an image, a second stage of defect detection can be initiated on the system controller for further intensive detection. Once the defect region is verified by the system controller 904, both the system controller 904 and the corresponding CIS can be used to carry out one or more actions such as triggering an alarm, stopping the individual loom, alerting an operator, or the like.

Within this system, the control application on the system controller 904 can operate one or more defect detection models as well a control functions. The defect detection models on the system controller 904 can comprise a machine learning approach that uses the image to identify the presence of a defect and/or classify the defect. The machine learning approach for the defect detection model can rely on a training data set that can be obtained from actual defect images. The images can be classified by human classifiers to provide a labeled data set suitable for use in developing the defect detection. The labeled data set can then be used to train the defect detection using machine learning, including any supervised or unsupervised learning approach. For example, the defect detection can be a neural network, a Bayesian network, a decision tree, a logistical regression model, a normalized logistical regression model, or the like. In some embodiments, the defect detection model on the system controller can be the same or different than the CIS model on the CIS systems.

Once the defect detection is trained, the defect detection can be used to determine the presence or absence of defects in the fabric image(s). The output of the defect detection can provide an indication of the presence of defect in the fabric, and in some embodiments, the defect detection can provide a classification of the defect. When the type or classification of the defect is provided, the information can be used to aid in a subsequent review by an operator and/or in identifying any issues needing correction with the loom. The defect identification process can be repeated for each image provided by the CIS on each loom to provide a nearly continuous monitor of the fabric being produced from the loom 100.

In some embodiments, the defect detection model can be similar to the CIS model executed at the CIS system at each loom 100. For example, the defect detection model can comprise a convolutional neural network having a plurality of layers. In general, the system controller 904 may be capable of operating a more complex model than the model at the CIS system at each loom. Thus, the defect detection model at the system controller 904 may have more layers and/or operating more nodes than the CIS model. As a result, the defect detection model can be similar to the CIS model, be trained in a similar manner using the same or similar data, but may operate with different parameters and/or be more complex than the CIS model. Any of the considerations described herein with respect to the CIS model, including the operation and arrangement of the CIS model, can also apply to the defect detection model at the system controller. In some embodiments, the defect detection model can comprise a SPM-CNN based model, and the defect detection model can accept similar images in a similar format to the CIS model such that the same images can be processed in both models.

As with the CIS model, the output of the defect detection model can be an identification of the presence of a defect and/or a classification of the defect. The use of the defect detection model at the system controller 904 can be used alone and/or in combination with the CIS model. For example, the images obtained at each CIS system on each loom 100 can be sent to the system controller 904 to be stored in the memory 908 and analyzed with the defect detection model. An output of the CIS model can also be sent to the system controller 904 to allow for a comparison of the outputs between the models to determine if a defect is present.

In some embodiments, the defect detection model at the system controller 904 may only analyze those images sent from the CIS systems that have been identified as containing defects. The defect detection model can then serve as a double check on whether or not a defect is present in the image. Since the defect detection model may be more robust than the CIS model, the CIS model may be tuned to overestimate the likelihood of a defect. The images can then be sent to the system controller 904 where the defect detection model can execute to determine if a defect is actually present. An alarm or other output may then only be generated if the defect detection model at the system controller also indicates the presence of a defect in the image. This may limit the amount of data transmitted between the CIS systems at each loom and the system controller 904 while providing a robust machine learning model approach to defect detection in images of the fabric in near real time.

Figure 11:
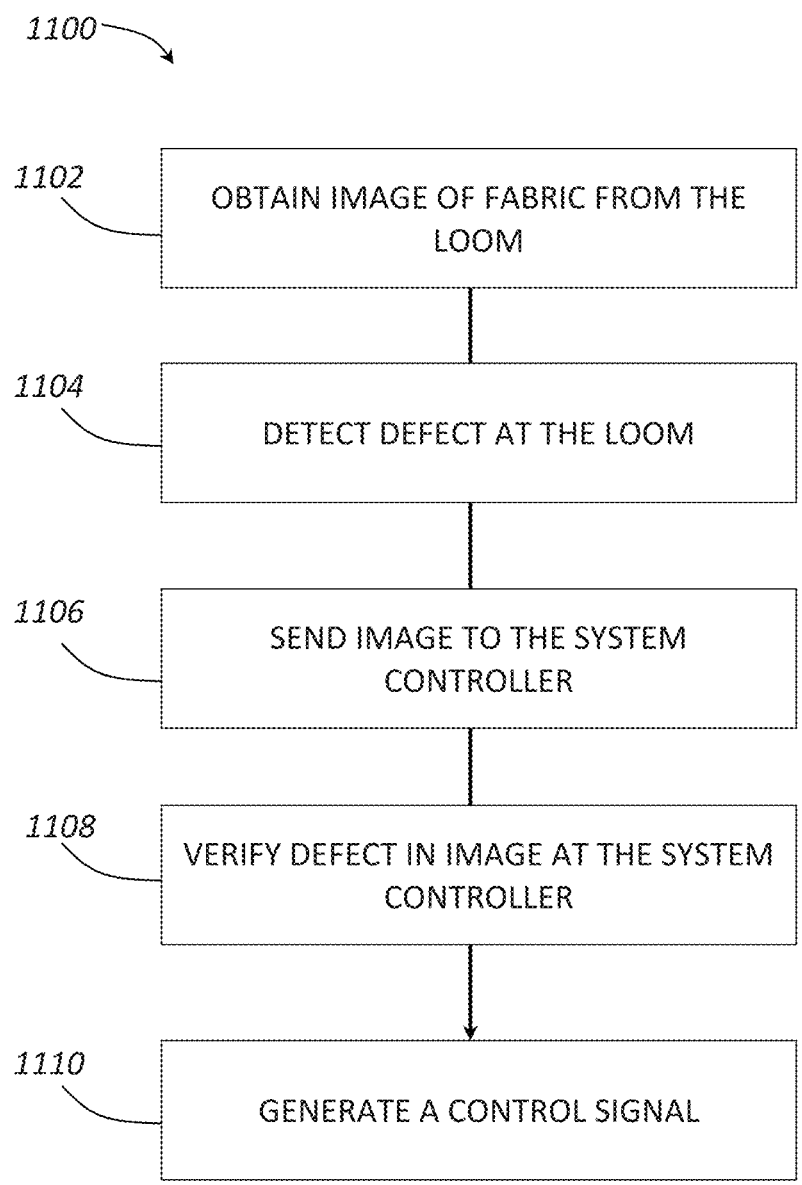
FIG. 11 illustrates a method of detecting defects in fabric according to some embodiments.

A method 1100 of detecting defects using the CIS systems and the system controller 904 is illustrated in FIG. 11. As shown, the method 1102 can begin with scanning an image of the fabric. The fabric can be scanned using the CIS on each loom. The image can then be transferred from the CIS to the CIS controller for processing using the CIS model. At step 1104, the image can be processed, by the CIS model on the CIS controller, to detect a defect in the image. For those images in which no defect is detected, the CIS controller can move to the next image to continue to process the images output from the CIS as the fabric is produced. For those images in which a defect is detected by the CIS model, the image can be sent over the communication link 902 to the system controller 904 at step 1106.

When received by the system controller 904, the image containing the defect can be received and stored at the system controller 904. The image can then be processed using the defect detection system at the system controller 904. At step 1108, the defect detection model can be used to verify the presence of a defect in the image received from the CIS system at the loom 100. The defect detection model can be different than the CIS model and as a result may not have the same output results. In some instances, the defect detection model can indicate that a defect is not present in the image received from the CIS system. In this instance, a response can be generated by the system controller and sent to the CIS controller to indicate that a defect was not present. In some instances, the defect detect model can verify the presence of the defect in the image of the fabric.

When the presence of the defect is verified, a control signal can be generated at step 1110. The control signal can comprise a variety of signals to initiate various actions. In some embodiments, an alarm signal or alert can be generated. The alert can serve to halt the operation of the loom or require additional input prior to shutting down the loom having the defects in the fabric. For example, the alert may send the image with the defect identified to one or more devices such as the mobile devices 914, the control interfaces 912, or the like. The ability to use a mobile device to receive the images and send verifications may allow for an operator to remain mobile within the facility while receiving updates on the looms throughout the facility. An operator can then perform a human based verification to determine if a defect is present. If a verification is received from the operator, then the loom may be stopped in order for the cause of the defect to be corrected. In some embodiments, the loom may be stopped or paused until the human based verification is received. If the verification indicates that a defect is not present, then the mobile device 914 and/or control interface 912 can be used to provide an input that can pass to the system controller 904 and then back to the CIS controller at the loom to restart the loom. While described as having a human based verification, such a verification is not needed in all embodiments.

The use of the system based defect detection can be used in a facility with a plurality of looms. The ability to have a distributed system in which a first defect detection is performed at the loom using the CIS controller followed by a more detailed defect detection at a system controller can allow for a distributed processing capability in a facility with a large number of looms using a relatively simple monitoring system. This system can still allow for on-loom detection and corrections while providing a second layer of defect verification. This system can be more accurate than other systems and significantly faster than requiring human based defect detection on a large number of images. This system also allows for the fabric to be monitored at or near the point the fabric is produced, where the monitoring can occur in near real time rather than having to produce an entire run of fabric prior to inspection.

Figure 12:
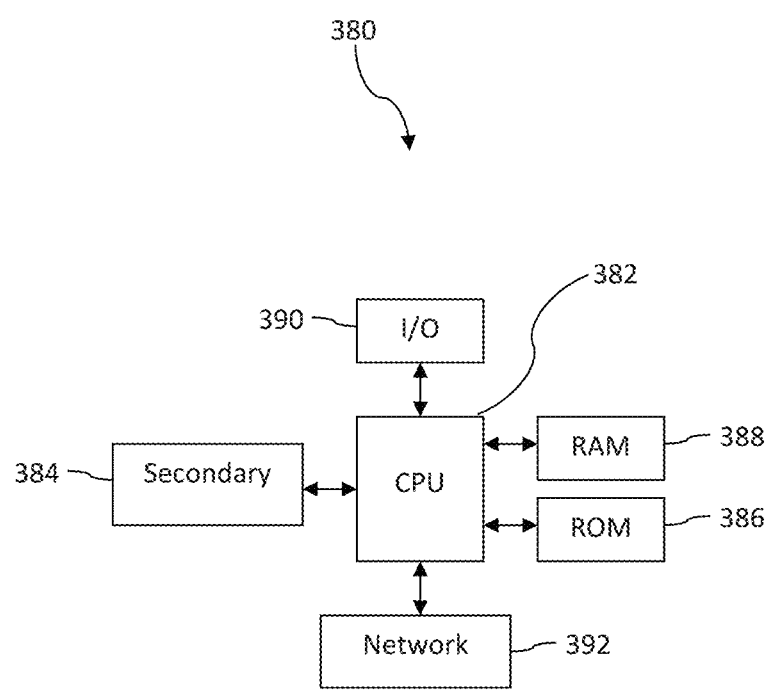
FIG. 12 illustrates a schematic representation of a computer according to some embodiments.

FIG. 12 illustrates a computer system 380 suitable for implementing one or more embodiments disclosed herein. For example, the CIS controller and/or the system controller can be implemented as a computer system as described herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

Having described various systems and methods herein, certain embodiments can include, but are not limited to:

In a first embodiment, a method of identifying defects in a fabric comprises obtaining an image of a fabric on a loom; extracting feature points within the image to generate an input image; processing the input image with a machine learning model; detecting one or more defects within the input image using the machine learning model; and providing, by the machine learning model, an indication of a defect in the input image.

A second embodiment can include the method of the first embodiment, further comprising: pre-processing the image prior to generating the input image.

A third embodiment can include the method of the second embodiment, wherein pre-processing comprises at least one of: performing a de-blurring process on the image, or normalizing the image.

A fourth embodiment can include the method of any one of the first to third embodiments, wherein obtaining the image of the fabric on the loom comprises: using a contact image sensor (CIS) positioned adjacent the fabric on the loom to obtain the image of the fabric.

A fifth embodiment can include the method of the fourth embodiment, wherein the CIS comprises a light source and an imaging sensor.

A sixth embodiment can include the method of the fourth or fifth embodiment, further comprising: controlling the CIS based on the image obtained from the CIS.

A seventh embodiment can include the method of the sixth embodiment, wherein controlling the CIS comprises: obtaining a positioning signal for the loom, wherein the positioning signal provides an indication of a position of the fabric on the loom; and controlling a rate of imaging of the fabric on the loom based on the positioning signal.

An eighth embodiment can include the method of any one of the first to seventh embodiments, wherein the machine learning model comprises a neural network.

A ninth embodiment can include the method of the eighth embodiment, wherein the neural network comprises a convolutional neural network.

A tenth embodiment can include the method of any one of the first to ninth embodiments, wherein the defect comprises one or more of: warp streaks, reediness, weft bar, weft crack, thick and thin locations, weft loops, box marks, high incidence of warp breaks, weft breaks, shuttle traps, shuttle flying, smashes, bad selvedge, broken picks, bullet, half pick, broken ends, coarse ends, coarse pick, slough off, thick end and thick picks, double end, end out, fine end, jerk-in, knot, loom bar, loom barre, misdraw, mispick, reed mark, reed streak, set mark, shade bar, stop bar, tight end, stain, float, pin marks, contamination of fluff, harness misdraw, slubs, or combinations thereof.

An eleventh embodiment can include the method of any one of the first to tenth embodiments, wherein the machine learning model comprises a spatial pyramid matching convolutional neural network.

An twelfth embodiment can include the method of any one of the first to eleventh embodiments, further comprising: pausing an operation of the loom based on the indication of the defect in the input image.

In a thirteenth embodiment, a method of identifying defects in a fabric comprises: obtaining an image of a fabric on a loom; detecting one or more defects within the image using a first machine learning model; sending the image to a system controller in response to detecting the one or more defects within the image; verifying, by the system controller, a presence of the one or more defects within the image using a second machine learning model; and generating, by the system controller, an output signal in response to verifying the presence of the one or more defects within the image.

A fourteenth embodiment can include the method of the thirteenth embodiment, further comprising: pre-processing the image prior to generating the input image.

A fifteenth embodiment can include the method of the fourteenth embodiment, wherein pre-processing comprises at least one of: performing a de-blurring process on the image, or normalizing the image.

A sixteenth embodiment can include the method of any one of the thirteenth to fifteenth embodiments, wherein obtaining the image of the fabric on the loom comprises: using a contact image sensor (CIS) positioned adjacent the fabric on the loom to obtain the image of the fabric.

A seventeenth embodiment can include the method of any one of the thirteenth to sixteenth embodiments, wherein the first machine learning model comprises a first neural network, and wherein the second machine learning model comprises a second neural network.

An eighteenth embodiment can include the method of the seventeenth embodiment, wherein the first neural network comprises a convolutional neural network.

A nineteenth embodiment can include the method of the seventeenth or eighteenth embodiment, wherein the first neural network and the second neural network comprise different parameters.

A twentieth embodiment can include the method of any one of the thirteenth to nineteenth embodiments, wherein the defect comprises one or more of: warp streaks, reediness, weft bar, weft crack, thick and thin locations, weft loops, box marks, high incidence of warp breaks, weft breaks, shuttle traps, shuttle flying, smashes, bad selvedge, broken picks, bullet, half pick, broken ends, coarse ends, coarse pick, slough off, thick end and thick picks, double end, end out, fine end, jerk-in, knot, loom bar, loom barre, misdraw, mispick, reed mark, reed streak, set mark, shade bar, stop bar, tight end, stain, float, pin marks, contamination of fluff, harness misdraw, slubs, or combinations thereof.

A twenty first embodiment can include the method of any one of the thirteenth to twentieth embodiments, further comprising: pausing an operation of the loom based on the output signal.

In a twenty second embodiment, a system for identifying defects in fabric comprises: a contact image sensor (CIS) configured to be coupled to a loom and image a fabric on the loom; and a CIS controller in signal communication with the CIS, wherein the CIS controller comprises a processor, wherein the CIS controller is configured to: receive an image of the fabric on the loom; process the image with a machine learning model; identify one or more defects in the fabric using the machine learning model; and provide an output indicative of the presence of the one or more defects in the fabric.

A twenty third embodiment can include the system of the twenty second embodiment, wherein the CIS comprises a light source and an imaging sensor.

A twenty fourth embodiment can include the system of the twenty second or twenty third embodiment, wherein the CIS comprises a plurality of CIS devices arranged in an array, wherein the array is as wide as or wider than a width of the fabric.

A twenty fifth embodiment can include the system of the twenty fourth embodiment, wherein at least one edge of each CIS device of the plurality of CIS devices overlaps with an adjacent CIS device of the plurality of CIS devices within the array.

A twenty sixth embodiment can include the system of any one of the twenty second to twenty fifth embodiments, further comprising: a system controller, wherein the system controller comprises a processor and is in signal communication with the CIS controller and a memory, wherein the system controller is configured to: receive, from the CIS controller, the output indicative of the presence of the one or more defects; receive, from the CIS controller, the image of the fabric on the loom; process, in response to the output indicative of the one or more defects, the image of the fabric on the loom; verify a presence of the one or more defects in the fabric; and provide a second output indicative of the presence of the one or more defects in the fabric.

A twenty seventh embodiment can include the system of any one of the twenty second to twenty sixth embodiments, wherein the machine learning model comprises a neural network.

A twenty eighth embodiment can include the system of the twenty seventh embodiment, wherein the neural network comprises a convolutional neural network.

A twenty ninth embodiment can include the system of any one of the twenty second to twenty eighth embodiments, further comprising: pre-processing the image prior to generating the input image.

A thirtieth embodiment can include the system of the twenty ninth embodiment, wherein pre-processing comprises at least one of: performing a de-blurring process on the image, or normalizing the image.

A thirty first embodiment can include the system of any one of the twenty sixth to thirtieth embodiments, further comprising: one or more mobile devices in signal communication with the system controller, wherein the one or more mobile devices are configured to receive the second output from the system controller.

A thirty second embodiment can include the system of the thirty first embodiment, wherein the one or more mobile devices are configured to display the image and receive an input from an operator to verify a presence of the defect in the image.

A thirty third embodiment can include the system of any one of the twenty second to thirty second embodiments, wherein the second output is configured to pause an operation of the loom.

Embodiments are discussed herein with reference to the Figures. However, those skilled in the art will readily appreciate that the detailed description given herein with respect to these figures is for explanatory purposes as the systems and methods extend beyond these limited embodiments. For example, it should be appreciated that those skilled in the art will, in light of the teachings of the present description, recognize a multiplicity of alternate and suitable approaches, depending upon the needs of the particular application, to implement the functionality of any given detail described herein, beyond the particular implementation choices in the following embodiments described and shown. That is, there are numerous modifications and variations that are too numerous to be listed but that all fit within the scope of the present description. Also, singular words should be read as plural and vice versa and masculine as feminine and vice versa, where appropriate, and alternative embodiments do not necessarily imply that the two are mutually exclusive.

It is to be further understood that the present description is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present systems and methods. It must be noted that as used herein and in the appended claims (in this application, or any derived applications thereof), the singular forms "a," "an," and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this description belongs. Preferred methods, techniques, devices, and materials are described, although any methods, techniques, devices, or materials similar or equivalent to those described herein may be used in the practice or testing of the present systems and methods. Structures described herein are to be understood also to refer to functional equivalents of such structures. The present systems and methods will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims may be formulated in this Application or of any further Application derived therefrom, to particular combinations of features, it should be understood that the scope of the disclosure also includes any novel feature or any novel combination of features disclosed herein either explicitly or implicitly or any generalization thereof, whether or not it relates to the same systems or methods as presently claimed in any Claim and whether or not it mitigates any or all of the same technical problems as do the present systems and methods.

Features which are described in the context of separate embodiments may also be provided in combination in a single embodiment. Conversely, various features which are, for brevity, described in the context of a single embodiment, may also be provided separately or in any suitable sub-combination. The Applicant(s) hereby give notice that new claims may be formulated to such features and/or combinations of such features during the prosecution of the present Application or of any further Application derived therefrom.

What is claimed is:

1. A method of identifying defects in a fabric, the method comprising:
    obtaining an image of the fabric on a loom;
    extracting feature points indicative of an intersection between a weft and a warp within the image to generate an input image, wherein the input image comprises a mapping of the feature points within the image, and wherein the input image has an area defined by a plurality of the feature points;
    processing the input image with a first machine learning model;
    detecting one or more defects within the input image using the first machine learning model;
    providing, by the first machine learning model, an indication of a defect in the input image; and
    providing a second machine leaning model, wherein the second machine learning model is configured to perform a further verification step of the one or more defects to confirm or deny the presence of the one or more defects of the detection from the first machine learning model, wherein the first machine learning model comprises a first neural network and the second machine learning model comprises a second neural network that is different from the first neural network, wherein the first neural network and the second neural network have different parameters,
    wherein the identifying defects in the fabric is performed in real-time for a defect inspection that is to perform in-situ defect detection to pause faulty production of the fabric for correction, wherein the correction involves, when the further verification step of the one or more defects confirms the presence of the one or more defects, stopping the loom to correct a cause of the one or more defects.

2. The method of claim 1, wherein pre-processing comprises at least one of: performing a de-blurring process on the image, or normalizing the image.

3. The method of claim 1, wherein obtaining the image of the fabric on the loom comprises:
    using a contact image sensor (CIS) positioned adjacent the fabric on the loom to obtain the image of the fabric.

4. The method of claim 3, further comprising:
    controlling the CIS based on the image obtained from the CIS.

5. The method of claim 4, wherein controlling the CIS comprises:
    obtaining a positioning signal for the loom, wherein the positioning signal provides an indication of a position of the fabric on the loom; and
    controlling a rate of imaging of the fabric on the loom based on the positioning signal.

6. The method of claim 1, wherein the machine learning model comprises a neural network, and wherein the neural network comprises a convolutional neural network or a spatial pyramid matching convolutional neural network.

7. The method of claim 1, wherein the defect comprises one or more of: warp streaks, reediness, weft bar, weft crack, thick and thin locations, weft loops, box marks, high incidence of warp breaks, weft breaks, shuttle traps, shuttle flying, smashes, bad selvedge, broken picks, bullet, half pick, broken ends, coarse ends, coarse pick, slough off, thick end and thick picks, double end, end out, fine end, jerk-in, knot, loom bar, loom barre, misdraw, mispick, reed mark, reed streak, set mark, shade bar, stop bar, tight end, stain, float, pin marks, contamination of fluff, harness misdraw, slubs, or combinations thereof.

8. The method of claim 1, further comprising:
    pausing an operation of the loom based on the indication of the defect in the input image.

9. A method of identifying defects in a fabric, the method comprising:
    obtaining an image of the fabric on a loom;
    detecting one or more defects associated with a fault of the loom and/or a yarn problem within the image using a first machine learning model;
    sending the image to a system controller in response to detecting the one or more defects within the image; and
    providing a second machine leaning model, wherein the second machine learning model is configured to perform a further verification step of the one or more defects to confirm or deny the presence of the one or more defects of the detection from the first machine learning model, wherein the first machine learning model comprises a first neural network and the second machine learning model comprises a second neural network that is different from the first neural network, wherein the first neural network and the second neural network have different parameters,
    generating, by the system controller, an output signal in response to the verification of-the presence of the one or more defects within the image,
    wherein the method of identifying defects in the fabric is performed in real-time that is to perform in-situ defect detection to pause faulty production of the fabric for correction, wherein the correction involves, when the further verification step of the one or more defects confirms the presence of the one or more defects, stopping the loom to correct a cause of the one or more defects.

10. The method of claim 9, wherein pre-processing comprises at least one of: performing a de-blurring process on the image, or normalizing the image.

11. The method of claim 9, wherein obtaining the image of the fabric on the loom comprises:
using a contact image sensor (CIS) positioned adjacent the fabric on the loom to obtain the image of the fabric.

12. The method of claim 9, wherein the first neural network and the second neural network comprise different parameters.

13. The method of claim 9, wherein the defect comprises one or more of: warp streaks, reediness, weft bar, weft crack, thick and thin locations, weft loops, box marks, high incidence of warp breaks, weft breaks, shuttle traps, shuttle flying, smashes, bad selvedge, broken picks, bullet, half pick, broken ends, coarse ends, coarse pick, slough off, thick end and thick picks, double end, end out, fine end, jerk-in, knot, loom bar, loom barre, misdraw, mispick, reed mark, reed streak, set mark, shade bar, stop bar, tight end, stain, float, pin marks, contamination of fluff, harness misdraw, slubs, or combinations thereof.

14. The method of claim 9, wherein the presence of the one or more defects within the image are verified via the second machine learning model after the one or more defects are detected via the first machine learning model.

15. A system for identifying defects in a fabric in real-time, the system comprising:
a contact image sensor (CIS) configured to be coupled to a loom and image the fabric on the loom; and
a CIS controller in signal communication with the CIS, wherein the CIS controller comprises a processor, wherein the CIS controller is configured to:
receive an image of the fabric on the loom;
process the image with a first machine learning model;
identify one or more defects associated with a fault of the loom and/or a yarn problem in the fabric using the first machine learning model; and provide an output indicative of the presence of the one or more defects in the fabric; and
a system controller, wherein the system controller comprises a processor and is in signal communication with the CIS controller and a memory storing instructions for the system, wherein the system controller is configured to:
receive, from the CIS controller, the output indicative of the presence of the one or more defects;
receive, from the CIS controller, the image of the fabric on the loom;
process-the image of the fabric on the loom using a second machine learning model via a further verification step of the one or more defects to confirm or deny the presence of the one or more defects of the detection from the first machine learning model;
verify the presence of the one or more defects in the fabric via the second machine learning model; and
provide a second output indicative of the presence of the one or more defects in the fabric,
wherein the first machine learning model comprises a first neural network and the second machine learning model comprises a second neural network that is different from the first neural network, wherein the first neural network and the second neural network have different parameters,
wherein the identification of defects in the fabric is performed in real-time that is to perform in-situ defect detection to pause faulty production of the fabric for correction, wherein the correction involves, when the further verification step of the one or more defects confirms the presence of the one or more defects, stopping the loom to correct a cause of the one or more defects.

16. The system of claim 15, wherein the CIS comprises a light source and an imaging sensor.

17. The system of claim 15, wherein the CIS comprises a plurality of CIS devices arranged in an array, wherein the array is as wide as or wider than a width of the fabric, wherein at least one edge of each CIS device of the plurality of CIS devices overlaps with an adjacent CIS device of the plurality of CIS devices within the array.

18. The system of claim 15, further comprising:
pre-processing the image prior to generating the input image, wherein the pre-processing comprises at least one of: performing a de-blurring process on the image, or normalizing the image.

19. The system of claim 15, further comprising:
one or more mobile devices in signal communication with the system controller, wherein the one or more mobile devices are configured to receive the second output from the system controller.

20. The system of claim 19, wherein the one or more mobile devices are configured to display the image and receive an input from an operator to verify a presence of the defect in the image.

21. The system of claim 15, wherein the system controller is configured such that the presence of the one or more defects within the image are verified via the second machine learning model after the one or more defects are detected via the first machine learning model.

\* \* \* \* \*